US011280416B1

(12) United States Patent
Su et al.

(10) Patent No.: US 11,280,416 B1
(45) Date of Patent: Mar. 22, 2022

(54) HIGH-TEMPERATURE QUICK-OPENING SPHERICAL SEALING SHUT-OFF VALVE

(71) Applicant: Zhejiang Petrochemical Valve Co., Ltd., Wenzhou (CN)

(72) Inventors: Jingpan Su, Wenzhou (CN); Xiheng Zhang, Wenzhou (CN); Hongqiang Yin, Wenzhou (CN); Huaimin Wu, Wenzhou (CN); Hongquan Xue, Wenzhou (CN); Longjie Yang, Wenzhou (CN); Jia Zhao, Wenzhou (CN); Sunli Zhang, Wenzhou (CN); Chengshuai Yang, Wenzhou (CN); Liaoyong Gu, Wenzhou (CN)

(73) Assignee: ZHEJIANG PETROCHEMICAL VALVE CO., LTD., Wenzhou (CN)

( * ) Notice: Subject to any disclaimer, the term of this patent is extended or adjusted under 35 U.S.C. 154(b) by 0 days.

(21) Appl. No.: 17/599,415

(22) PCT Filed: Dec. 15, 2020

(86) PCT No.: PCT/CN2020/136380
§ 371 (c)(1),
(2) Date: Sep. 28, 2021

(30) Foreign Application Priority Data

Nov. 25, 2020 (CN) .......................... 2020113365305

(51) Int. Cl.
*F16K 11/076* (2006.01)
*F16K 27/04* (2006.01)
*F16K 31/04* (2006.01)

(52) U.S. Cl.
CPC .......... *F16K 11/076* (2013.01); *F16K 27/048* (2013.01); *F16K 31/043* (2013.01)

(58) Field of Classification Search
CPC ........................ F16K 11/076; Y10T 137/86831
See application file for complete search history.

(56) References Cited

U.S. PATENT DOCUMENTS

| 2,028,696 A | * | 1/1936 | Beckwith | ................ F16K 31/05 475/2 |
| 2003/0037740 A1 | * | 2/2003 | Watanabe | ................. F01L 1/34 123/90.15 |
| 2015/0182734 A1 | * | 7/2015 | Miethke | .............. A61M 27/006 604/9 |

FOREIGN PATENT DOCUMENTS

| CN | 1648499 A | 8/2005 |
| CN | 104455478 A | 3/2015 |
| CN | 207673894 U | 7/2018 |

(Continued)

*Primary Examiner* — Kevin R Barss
(74) *Attorney, Agent, or Firm* — Christensen, Fonder, Dardi & Herbert PLLC

(57) ABSTRACT

A high-temperature quick-opening spherical sealing shut-off valve that includes a valve body, a valve seat, a valve cover, a valve clack, a valve rod, and a driving device for driving the valve rod to rotate. A friction-adjusting mechanism is mounted on the valve rod. The valve rod is arranged coaxially and connected to the valve clack. A gas outlet passage is formed in the valve body and the valve cover. The valve clack and valve seat are located in the path of the gas outlet passage. The valve seat is mounted in the valve body and has a first through hole communicating with the gas outlet passage. The valve clack has a second through hole corresponding to the first through hole. The gas outlet passage has three states: open when the first hole fully overlaps the second hole, half-open when the holes partially overlap, and closed when no overlap.

9 Claims, 9 Drawing Sheets

(56) References Cited

FOREIGN PATENT DOCUMENTS

| | | | |
|---|---|---|---|
| CN | 111963706 | A | 11/2020 |
| CN | 112361023 | A | 2/2021 |
| CN | 112361025 | A | 2/2021 |
| CN | 112361070 | A | 2/2021 |
| JP | 2016-191403 | A | 11/2016 |

\* cited by examiner

Square Wave Pattern of Open-Close Time of the Quick-Opening Valve

HIGH-TEMPERATURE QUICK-OPENING SPHERICAL SEALING SHUT-OFF VALVE

RELATED APPLICATIONS

The present application is a National Phase entry of PCT Application No. PCT/CN2020/136380, filed Dec. 15, 2020, which claims priority to Chinese Patent Application No. 2020113365305, filed Nov. 25, 2020, the disclosures of which are hereby incorporated by reference herein in their entirety.

TECHNICAL FIELD

The present invention relates to the field of valves, and in particular, to a high-temperature quick-opening spherical sealing shut-off valve.

BACKGROUND OF THE INVENTION

When an existing high-temperature shut-off valve is used in a scenario in which the medium is high temperature argon at a temperature of 730° C. and under a pressure of 3 MPa, the equivalent pressure-temperature rating of the valve is required to be DN80, Class1500. Existing pneumatically actuated, hydraulically actuated, solenoid-actuated and explosive-actuated shut-off valves cannot solve the problem of high pressure produced during the shutting-off operation. Consequently, the service life of the valve is affected by this problem.

SUMMARY OF THE INVENTION

Technical Problem

To overcome the shortcoming of the prior art, the present invention provides a high-temperature quick-opening spherical sealing shut-off valve with good pressure relief and diversion effects.

Solutions to the Problem

Technical Solutions

The present invention adopts the following technical solutions: a high-temperature quick-opening spherical sealing shut-off valve includes a valve body, a valve seat, a valve cover, a valve clack, a valve rod, and a driving device for driving the valve rod to rotate. A friction adjusting mechanism for adjusting the friction between the valve clack and the valve seat is mounted on the valve rod.

The valve rod is arranged coaxially and connected fixedly with the valve clack. A gas outlet passage for a gas to circulate is formed in the valve body and the valve cover. The valve clack and the valve seat are located in the path of the gas outlet passage. The valve seat is fixedly mounted in the valve body and has a first through hole communicated with the gas outlet passage. The valve clack has a second through hole corresponding to the first through hole. The gas outlet passage has three states, namely open when the valve clack rotates and the first through hole fully overlaps the second through hole, half-open in case of partially overlapping, and closed in case of not overlapping.

A first inlet for a gas to flow in is formed in an upper surface of the valve cover. A second inlet is formed below and communicated with the first inlet. A third inlet circumferentially symmetric to the first inlet is formed in the valve cover. The third inlet is not communicated with the upper surface of the valve cover. A first annular groove is formed between the first inlet and the third inlet, so that the two inlets are communicated with each other.

A first outlet for a gas to flow out is formed in a lower surface of the valve body. A second outlet is formed above and communicated with the first outlet. A third outlet circumferentially symmetric to the first outlet is formed in the valve body. The third outlet is not communicated with the lower surface of the valve body. A second annular groove is formed between the first outlet and the third outlet such that the two outlets are communicated with each other.

The second through holes and the first through holes are distributed in a circumferentially symmetric manner. The first inlet, the first outlet, one of the second through holes and one of the first through holes correspond to and are communicated with one another to form the gas outlet passage. The second inlet, the second outlet, the other first through hole and the other second through hole correspond to one another and are communicated with the first annular groove and the second annular groove to form diverting passages for pressure relief and diversion.

The first through hole and the second through hole are kidney-shaped arc type holes. The first through hole has an included angle of 11.1°, while the second through hole has an included angle of 66.6°.

The valve rod includes an upper valve rod and a lower valve rod that are fixedly mounted on upper and lower sides of the center of the valve clack. The upper valve rod and the valve clack are hollowed out and communicated with each other. A valve rod core assembly is coaxially inserted into the upper valve rod. An upper end of the valve rod core assembly is in seal fit with an upper end of the upper valve rod. A water inlet pipe and a water outlet pipe are disposed at the upper end of the valve rod core assembly, and a channel for cooling water to flow in and out of the upper valve rod and the valve clack is disposed within the valve rod core assembly.

The channel includes a water inlet passage and a water outlet passage. The water inlet passage is located along the axis of the valve rod core assembly, and a horizontal tube extending into the valve clack is disposed at a tail end of the water inlet passage. A gap is formed between a circumferential surface of the valve rod core assembly and an inner wall of the valve rod. A water outlet communicated with the water outlet passage is formed in the circumferential surface of the valve rod core assembly.

Steel plates are hermetically mounted at outer circumferential positions of the valve body and the valve cover. A gap is formed between each of the steel plates and each of the valve body and the valve cover. The steel plates have a plurality of pipe joints allowing cooling water to flow in and out.

The valve clack includes a clack body and a cover plate. Mounting grooves for mounting of the cover plate are formed in upper and lower side faces of the clack body, respectively. A central hole for holding the horizontal tube is formed in the clack body. A spherical seal is formed between the cover plate and each of the mounting grooves. A surface of the valve clack that is in contact with the valve seat is spray-coated with a metal film.

A sealing ring is disposed between the valve clack and each of the valve cover and the valve seat. The sealing ring includes an inner side and an outer side that are located at the second through holes. Oil filling holes communicated with the sealing rings are formed in the valve cover and the valve seat.

An upper support is mounted on the valve cover, while a lower support is mounted on the valve body. The upper valve rod is rotatably mounted on the upper support, while the lower valve rod is rotatably mounted on the lower support. The friction adjusting mechanism is mounted between the lower support and the lower valve rod. The friction adjusting mechanism includes a plurality of adjusting seats and check nuts. The adjusting seats are sleeved on and in running fit with the lower valve rod. The outer circumference of each adjusting seat is in screw thread fit with the lower support. Anti-rotation blocks corresponding to the adjusting seats are mounted on the lower support.

A connecting cap is disposed on the upper valve rod, and the connecting cap covers the valve rod core assembly. Thrust ball bearings are disposed between each adjusting seat and the lower valve rod and between the connecting cap and the valve rod core assembly, respectively.

A deep groove ball bearing is disposed between the upper valve rod and the upper support.

Rotary shaft lip seals are disposed between the lower valve rod and the valve body, between the valve rod core assembly and the upper valve rod and between the upper valve rod and the valve cover, respectively, and filled with a lubricating sealing grease.

Advantages of the Present Invention

Advantages

The present invention has the following advantages: according to the technical solutions, the valve rod is driven by the driving device to rotate, thereby causing the valve clack to rotate in a cavity formed by the valve cover and the valve seat. When the valve clack rotates, the second through hole is allowed to fully overlap, partially overlap and not overlap the gas outlet passage, which correspond to open, partially open and closed states of the shut-off valve of the present application, respectively. Thus, continued injection at intervals can be realized for high temperature argon passing through the gas outlet passage. The shut-off valve has the advantages of good operating stability and good pressure relief and diversion effects.

DETAILED DESCRIPTION OF THE INVENTION

Figure 1:
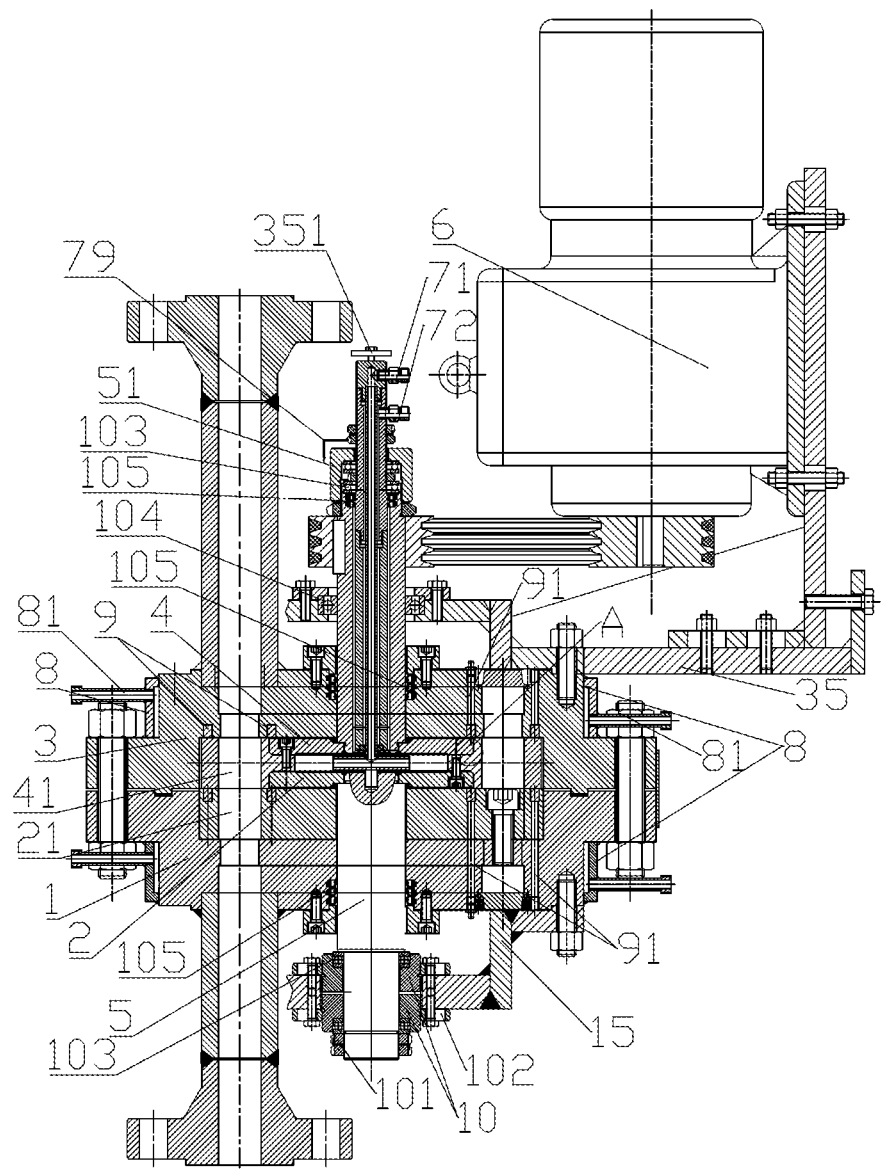
FIG. 1 is a schematic structural diagram of a high-temperature quick-opening spherical sealing shut-off valve according to an embodiment of the present invention.
Figure 2:
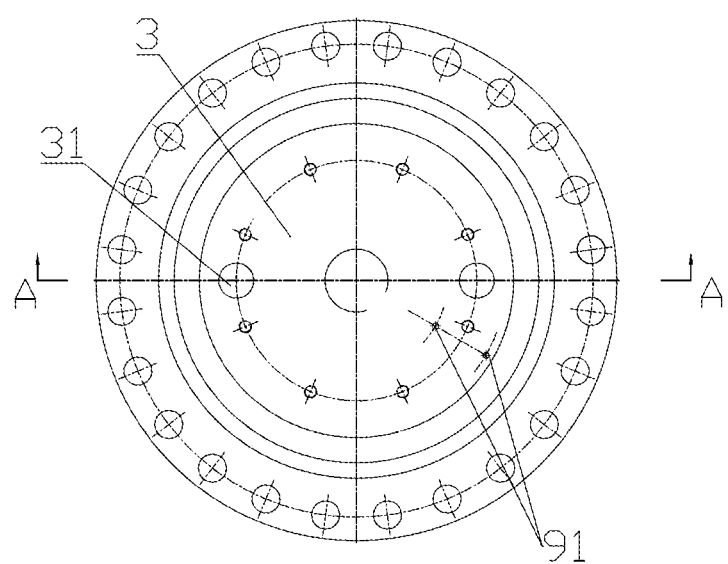
FIG. 2 is a top view of a valve cover.
Figure 3:
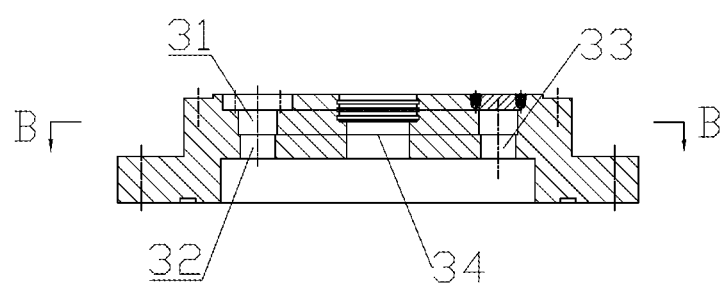
FIG. 3 is a sectional view taken along line A-A of FIG. 2.
Figure 4:
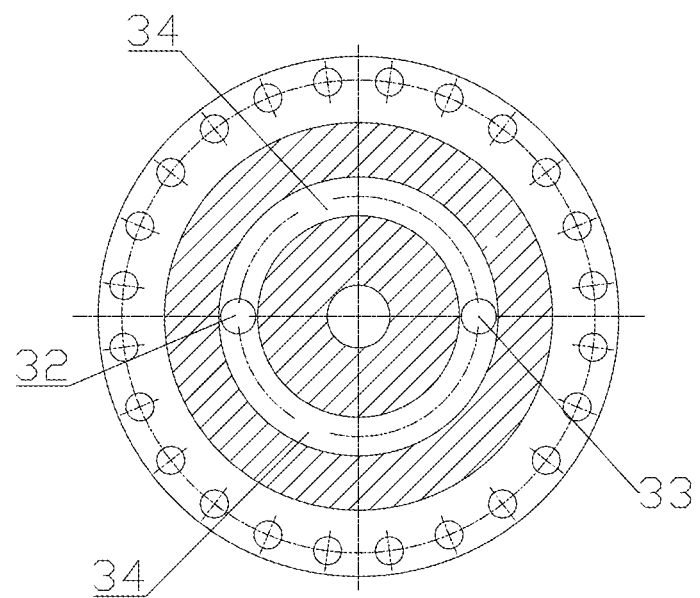
FIG. 4 is a sectional view taken along line B-B of FIG. 3.
Figure 5:
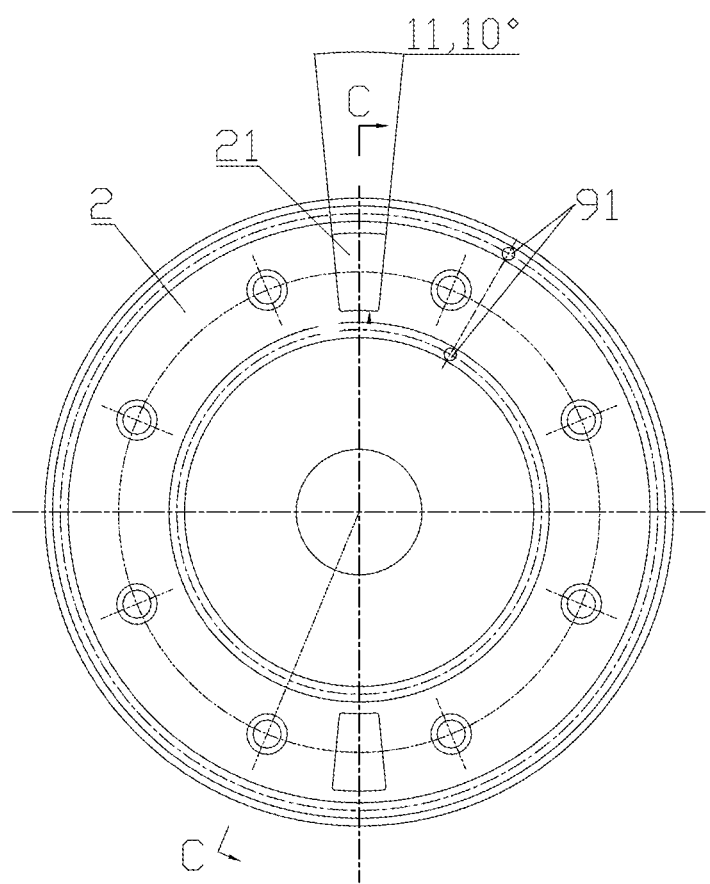
FIG. 5 is a top view of a valve seat.
Figure 6:
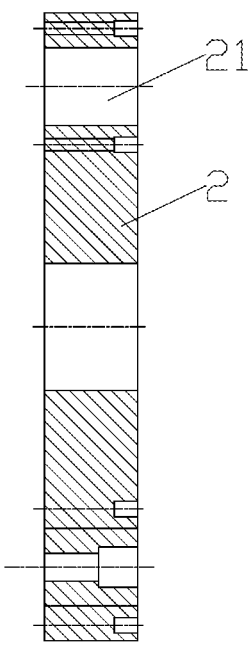
FIG. 6 is a sectional view taken along line C-C of FIG. 5.
Figure 7:
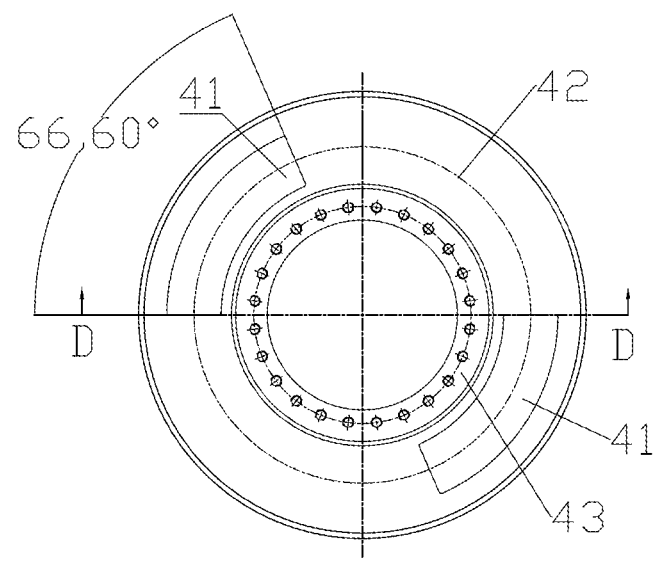
FIG. 7 is a top view of a valve clack.
Figure 8:
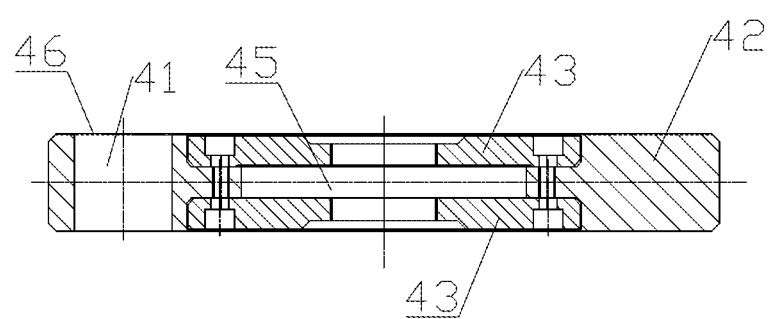
FIG. 8 is a sectional view taken along line C-C of FIG. 7.
Figure 9:
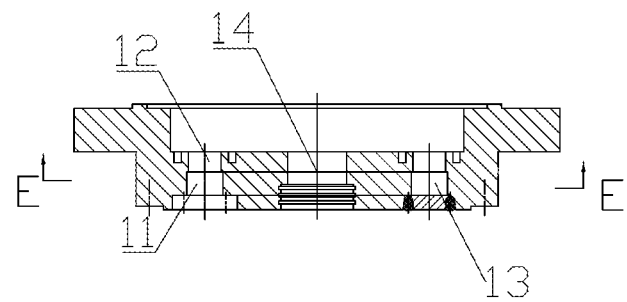
FIG. 9 is a sectional view of a valve body.
Figure 10:
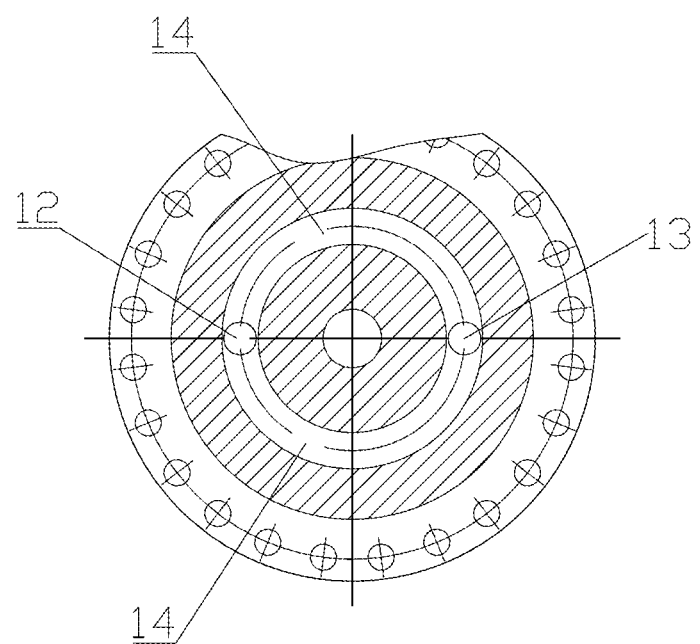
FIG. 10 is a sectional view taken along line E-E of FIG. 9.
Figure 11:
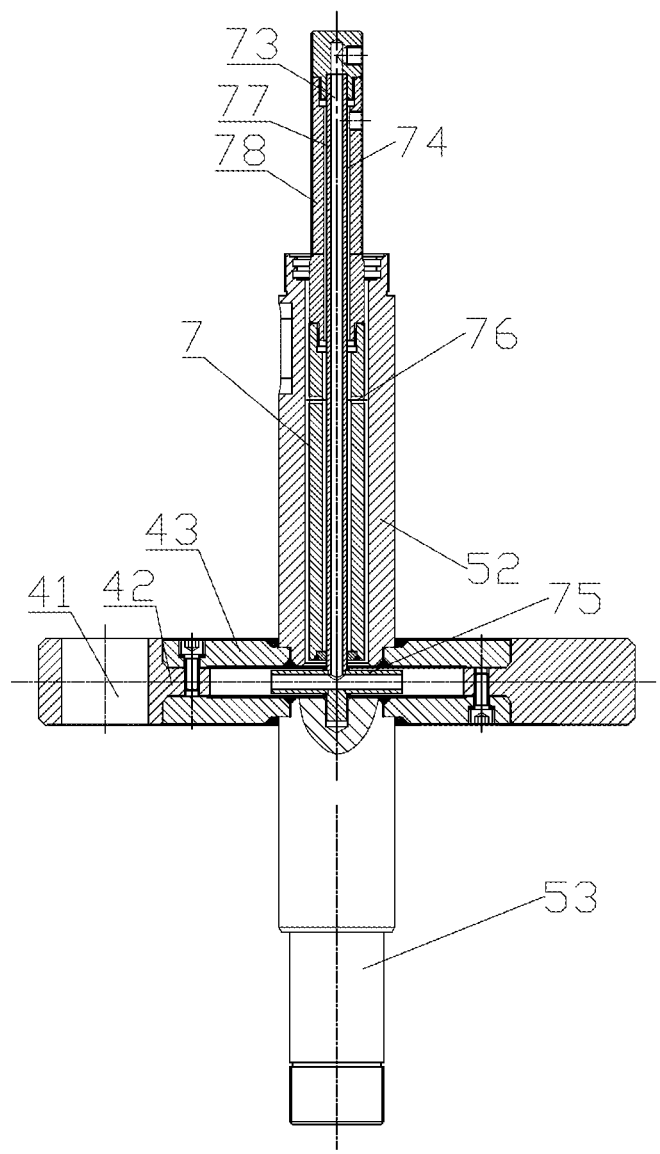
FIG. 11 is a schematic structural diagram of a valve rod, a valve clack and a valve rod core assembly.

Embodiments of the present invention will be further described with reference to the accompanying drawings.

As shown in the drawings, a high-temperature quick-opening spherical sealing shut-off valve includes a valve body 1, a valve seat 2, a valve cover 3, a valve clack 4, a valve rod 5, and a driving device 6 for driving the valve rod 5 to rotate. A friction adjusting mechanism for adjusting the friction between the valve clack 4 and the valve seat 2 is mounted on the valve rod 5.

The valve rod 5 is arranged coaxially and connected fixedly with the valve clack 4. A gas outlet passage for a gas to circulate is formed in the valve body 1 and the valve cover 3. The valve clack 4 and the valve seat 2 are located in the path of the gas outlet passage. The valve seat 2 is fixedly mounted in the valve body 1 and has a first through hole 21 communicated with the gas outlet passage. The valve clack 4 has a second through hole 41 corresponding to the first through hole 21. The gas outlet passage has three states, namely open when the valve clack 4 rotates and the first through hole 21 fully overlaps the second through hole 41, half-open in case of partially overlapping, and closed in case of not overlapping. According to the technical solutions, the valve rod is driven by the driving device to rotate, thereby causing the valve clack to rotate in a cavity formed by the valve cover and the valve seat. When the valve clack rotates, the second through hole is allowed to fully overlap, partially overlap and not overlap the gas outlet passage, which correspond to open, partially open and closed states of the shut-off valve of the present invention, respectively. Thus, continued injection at intervals can be realized for high temperature argon passing through the gas outlet passage. The shut-off valve has the advantages of good operating stability and good pressure relief and diversion effects.

A motor is used as the driving device to drive the valve rod and the valve clack to rotate. The valve clack has two kidney-shaped arc type second through holes. The valve seat has two first through holes, and an outer arc radius and an inner arc radius of each first through hole are identical to the corresponding radii of each second through hole of the valve clack, respectively. When the valve clack rotates, the first through holes of the valve seat fully overlap the second through holes of the valve clack, allowing a gas to flow therethrough, the valve is open. In case of partially overlapping, the valve is half-open or half-closed. In case of totally not overlapping, the valve is closed. The opening and closing of the valve depend on whether the first through holes of the valve seat overlap the second through holes of the valve clack.

A first inlet 31 for a gas to flow in is formed in an upper surface of the valve cover 3. A second inlet 32 is formed below and communicated with the first inlet 31. A third inlet 33 circumferentially symmetric to the first inlet 31 is formed in the valve cover 3. The third inlet 33 is not communicated with the upper surface of the valve cover 3. A first annular groove 34 is formed between the first inlet 31 and the third inlet 33, so that the two inlets are communicated with each other.

A first outlet 11 for a gas to flow out is formed in a lower surface of the valve body 1. A second outlet 12 is formed above and communicated with the first outlet 11. A third outlet 13 circumferentially symmetric to the first outlet 11 is formed in the valve body 1. The third outlet 13 is not communicated with the lower surface of the valve body 1. A second annular groove 14 is formed between the first outlet 11 and the third outlet 13, so that the two outlets are communicated with each other.

The second through holes 41 and the first through holes 21 are distributed in a circumferentially symmetric manner. The first inlet 31, the first outlet 11, one of the second through holes 41 and one of the first through holes 21 correspond to and are communicated with one another to form the gas outlet passage. The second inlet 32, the second outlet 12, the other first through hole 21 and the other second through hole 41 correspond to one another and are communicated with the first annular groove 34 and the second annular groove 14 to form diverting passages for pressure relief and diversion. The diverting passages of the valve cover and the valve body are both auxiliary passages serving for diversion and pressure balancing. A high temperature gas flows in the first inlet of the valve cover from an upper pipe, and after flowing through the first inlet, is diverted directly down to the upper plane of the valve clack from the second inlet 32 in one direction, and to the third inlet via the first annular groove before flowing to the valve clack in the other direction. Here, the number of the first annular grooves is two. When the second through holes of the valve clack are accessible by the gas flowing through the first inlet and the third inlet, the gas can flow in the first through holes of the valve seat via the valve clack, flow in the first outlet of the valve body via the second annular groove of the valve body, and finally flow out. Thus, pressure relief and diversion are achieved.

The first through hole 21 and the second through hole 41 are kidney-shaped arc type holes. The first through hole 21 has an included angle of 11.1°, while the second through hole 41 has an included angle of 66.6°.

An electromagnetic adjustable-speed three-phase asynchronous motor with a speed adjustable range of 125 rpm to 1250 rpm is selected as the driving device of the valve. When the second through holes of the valve clack fully overlap the first through holes of the valve seat, the valve is full open. In case of partially overlapping, the valve is half-open or half-closed. In case of totally not overlapping, the valve is closed. Since the two second through holes of the valve clack and the two first through holes of the valve seat are distributed in a circumferentially symmetric manner, all that is needed is to calculate an overlap ratio of one approximate square hole. Since the included angle of the second through hole of the valve clack is 66.6° and the included angle of the first through hole of the valve seat 11.1°, the included angle in the full open state can be calculated as: 66.6°−11.1°×2=44.4°. In the embodiment of the present invention, according to the valve function, the duration of full opening is required to be 20 ms, while the rotation of rotation per degree to be 20 ms÷44.4°=0.45 ms/degree, the duration of half-opening to be 0.45× 11.1=4.9955 ms, and the duration of closing to be 180°− 66.6°×0.45=51.0351 ms.

Figure 12:
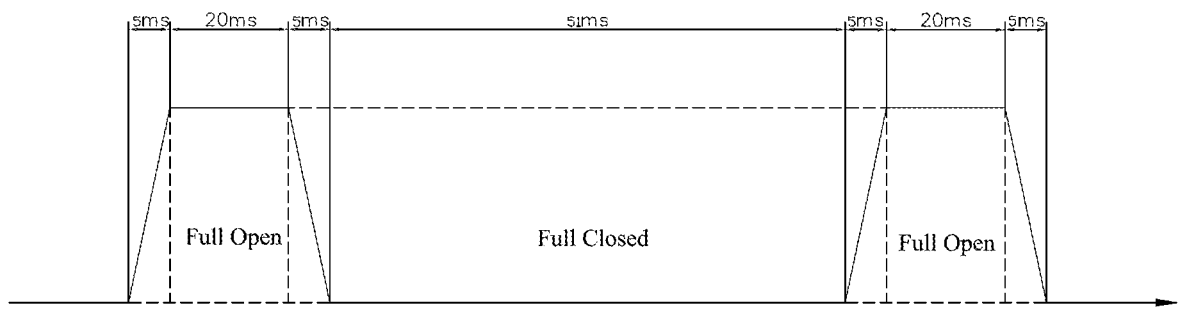
FIG. 12 is a square wave pattern of open-close time of a high-temperature quick-opening spherical sealing shut-off valve.

The rotating speed of the motor is calculated as follows: because of having a same diameter, a motor pulley and a valve rod pulley rotate at the same speed. The valve rod and the valve clack are integrated and thus rotate synchronously. The time for one revolution of the valve clack is: 360÷44.4× 0.02=0.162 seconds, and the number of revolutions per minute is: 60÷0.162=370 rpm. Thus, the customer's high requirements for the valve opening duration (0.02 seconds) and closing duration (less than 0.05 seconds) are met. As shown in FIG. 12, the valve rod 5 includes an upper valve rod 52 and a lower valve rod 53 that are fixedly mounted on upper and lower sides of the center of the valve clack 4. The upper valve rod 52 and the valve clack 4 are hollowed out and communicated with each other. A valve rod core assembly 7 is coaxially inserted into the upper valve rod 52. An upper end of the valve rod core assembly 7 is in seal fit with an upper end of the upper valve rod 52. A water inlet pipe 71 and a water outlet pipe 72 are disposed at the upper end of the valve rod core assembly 7, and a channel for cooling water to flow in and out of the upper valve rod and the valve clack to cool the upper valve rod and the valve clack is disposed within the valve rod core assembly.

The channel includes a water inlet passage 73 and a water outlet passage 74. The water inlet passage 73 is located along the axis of the valve rod core assembly 7, and a horizontal tube 75 extending into the valve clack 4 is disposed at a tail end of the water inlet passage. A gap is formed between a circumferential surface of the valve rod core assembly 7 and an inner wall of the valve rod 5. A water outlet 76 communicated with the water outlet passage 74 is formed in the circumferential surface of the valve rod core assembly 7. Cooling water enters the water inlet passage from the water inlet pipe and goes straight down into the valve clack through the horizontal tube to cool the valve clack. The cooling water then gradually fills the valve clack, enters the gap between the inner wall of the upper valve rod and the valve rod core assembly, then enters the water outlet passage via the water outlet, and finally flows out of the water outlet pipe.

Steel plates 8 are hermetically mounted at outer circumferential positions of the valve body 1 and the valve cover 3. A gap is formed between each of the steel plates 8 and each of the valve body 1 and the valve cover 3. The steel plates 8 have a plurality of pipe joints 81 allowing cooling water to flow in and out. Cooling water flows in from one side and absorbs heat for cooling until it flows out from the other side, thereby achieving the effect of cooling the valve body and the valve cover.

A sealing ring 9 is disposed between the valve clack 4 and each of the valve cover 3 and the valve seat 2. The sealing ring 9 includes an inner side and an outer side that are located at the second through holes 41. Oil filling holes 91 communicated with the sealing rings 9 are formed in the valve cover 3 and the valve seat 2. When the valve clack rotates at a high speed, planar friction is induced between the valve clack and the sealing rings of the valve cover and the valve seat. To reduce the coefficient of friction, a lubricating oil is allowed to flow to the sealing surfaces of the valve seat and the valve cover, so that dry friction is changed into lubricating friction. R-shaped oil sumps (not shown) are formed in the sealing surfaces. It is required that glass oil cups be placed outside the valve cover and the valve seat and be replenished with oil when it is used up. The oil cups must be placed at horizontal positions above the sealing surfaces, so that the lubricating oil flows to the sealing surfaces under the action of gravity.

Figure 13:
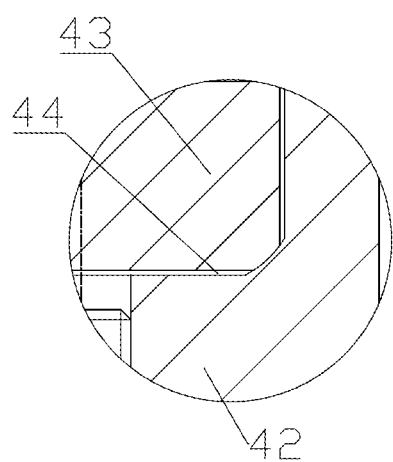
FIG. 13 is a partial enlarged diagram of area A in FIG. 1.

The valve clack 4 includes a clack body 42 and a cover plate 43. Mounting grooves 44 for mounting of the cover plate 43 are formed in upper and lower side faces of the clack body 42, respectively. A spherical seal is formed between the cover plate 43 and each of the mounting grooves 44. As shown in FIG. 13, a central hole 45 for holding the horizontal tube is formed in the clack body 41. The surfaces, which are in contact with the valve seat 2 and the valve cover 3, respectively, of the valve clack 4 are spray-coated with metal films 46. The metal film 46 is made of tungsten carbide. Since the sealing pairs of the valve clack and the valve seat and the valve cover rotate at a high speed, the sealing surfaces are supersonically spray-welded with a WC hard material which has a hardness of above HRC60 and is wearproof. In the embodiment, after the horizontal tube of the valve rod core assembly is placed into the central hole, the cover plate is fixedly mounted on the mounting grooves by means of bolts, and the valve rod is fixed to the part, located on the upper surface of the clack body, of the cover plate by welding, so that the valve clack and the valve rod are integrated.

An upper support 35 is mounted on the valve cover 3, while a lower support 15 is mounted on the valve body 1. The upper valve rod 52 is rotatably mounted on the upper support 35, while the lower valve rod 53 is rotatably mounted on the lower support 15. The friction adjusting mechanism is mounted between the lower support 15 and the lower valve rod 53. The friction adjusting mechanism includes a plurality of adjusting seats 10 and check nuts 101. The adjusting seats 10 are sleeved on and in running fit with the lower valve rod 53. The outer circumference of each adjusting seat 10 is in screw thread fit with the lower support 15. Anti-rotation blocks 102 corresponding to the adjusting seats 10 are mounted on the lower support 15. The valve clack rotates at an extremely high speed, which is about 370 rpm, mutual friction is induced between the valve clack and the sealing surface of the valve seat during the opening and closing of the valve. The magnitude of the friction is in direct proportion to positive pressure and the coefficient of friction. To reduce the positive pressure, the gap between the two sealing pairs needs to be adjusted. If the gap is large, the friction may be low, leading to easy leakage, and the valve cannot be sealed. If the gap is small or there is no gap, the friction may be increased. It is desirable that the gap is adjusted so that a seal can be formed with low friction. In the embodiment, the lower valve rod can be pulled up and down by means of the adjusting seats. Thus, the gap of the sealing pair of the valve clack and the valve seat can be adjusted, thereby achieving the effect of adjusting the sealing friction of the valve clack.

A connecting cap 51 is disposed on the upper valve rod 52, and the connecting cap 51 covers the valve rod core assembly 7.

Thrust ball bearings 103 are disposed between each adjusting seat 10 and the lower valve rod 53 and between the connecting cap 51 and the valve rod core assembly 7, respectively.

A deep groove ball bearing 104 is disposed between the upper valve rod 52 and the upper support 35. When mounted, these ball bearings need to be filled with a lubricating grease for lubrication.

Lip seals 105 are disposed between the lower valve rod 53 and the valve body 1, between the valve rod core assembly 7 and the upper valve rod 52 and between the upper valve rod 52 and the valve cover 3, respectively, and filled with a lubricating sealing grease. To reduce the friction of the sealing pair rotating at a high speed, an oil lubricant is added to the sealing surface to reduce the coefficient of friction, thus allowing for easy revolution and prolonging of the service life. Since the upper valve rod rotates at a high speed in the valve cover and the lower valve rod rotates at a high speed in the valve body, a set of mechanical sealing rings needs to be mounted in the quick-opening valve for preventing leakage of high-temperature high-pressure gas. Each set includes three lip seals each made of high-temperature reinforced polytetrafluoroethylene (RPTFE) with a framework, and each lip seal is enclosed by an O-shaped sealing ring. Moreover, the lip seal is filled with a high-temperature molybdenum disulfide lubricant.

The horizontal tube 75 is a hollow shaft, and the water inlet passage 73 is communicated with the circumferential surface of the horizontal tube 75.

The valve rod core assembly includes a hollow main tube 78 and a hollow branch tube 77. The hollow branch tube is inserted into the hollow main tube 78 with a gap therebetween. The hollow branch tube serves as the water inlet passage, and the gap between the hollow branch tube and the hollow main tube 78 serves as the water outlet passage.

The upper support 35 is mounted on the valve cover 3 and the upper valve rod 52 is rotatably mounted on the upper support 35. An anti-rotation plate 351 is crookedly disposed between the valve rod core assembly 7 and the upper support 35 to connect the two. Since friction is induced between the lip seal and the upper valve rod to form a torque and a cooling water pipe joint and an adapting pipe are arranged at the upper end of the valve rod core assembly to prevent rotation of the valve rod core assembly, the anti-rotation plate is arranged on the upper support and the top end of the valve rod core.

The connecting cap 51 is disposed on the upper valve rod 52, and the connecting cap 51 covers and is in running fit with the valve rod core assembly 7. Pointers 79 are mounted on the valve rod core assembly 7. Color marks identifying and corresponding to the pointers 79 are formed on the outer surface of the connecting cap 7. To keep the valve in the closed position, the pointers are mounted on the upper part of the valve rod core assembly and the corresponding parts of the outer circle of the connecting cap are coated with different color marks (red and blue).

It should be understood that in the description of the present invention, orientations or positional relationships by terms such as "central", "longitudinal", "transverse", "upper", "lower", "front", "rear", "left", "right", "vertical", "horizontal", "top", "bottom", "inside" and "outside" are all based on what are illustrated in the drawings, and such terms are used herein for ease and simplification of description of the present invention rather than indicating or implying that the stated device or element must have a specific orientation or must be constructed and operated in a specific orientation, and thus cannot be construed as limitations to the present invention. Moreover, terms such as "first" and "second" are merely intended for the purpose of description, and should not be construed as indicating or implying relative importance.

In the description of the present invention, it should be noted that, unless otherwise clearly specified and limited, meanings of terms "mount" and "connect" should be understood in a board sense. For example, the connection may be a fixed connection, a removable connection, or an integral connection; it may be a mechanical connection or an electrical connection; it may be a direct connection or an indirect connection by using an intermediate medium; or it may be intercommunication between two components. A person of ordinary skill in the art may understand specific meanings of the foregoing terms in the present invention based on a specific situation. In addition, in the description of the present invention, unless otherwise specified, "a plurality of" means two or more.

It should be understood by those skilled in the art that while the present invention is described in terms of the above specific embodiments, the inventive concept of the present invention is not limited thereto, and any modification made based on the ideas of the present invention shall be encompassed in the protection scope of the present invention.

The invention claimed is:

1. A high-temperature quick-opening spherical sealing shut-off valve, comprising:
   a valve body, a valve seat, a valve cover, a valve clack, a valve rod, and a driving device for driving the valve rod to rotate, wherein a friction adjusting mechanism for adjusting the friction between the valve clack and the valve seat is mounted on the valve rod;

the valve rod (5) is arranged coaxially and connected fixedly with the valve clack; a gas outlet passage for a passage to circulate is formed in the valve body and the valve cover; the valve clack and the valve seat are located in a path of the gas outlet passage; the valve seat is fixedly mounted in the valve body and has a first through hole in communication with the gas outlet passage; the valve clack has a second through hole corresponding to the first through hole; and the gas outlet passage has three states: open when the valve clack rotates and the first through hole fully overlaps the second through hole, half-open in case of partially overlapping, and closed in case of not overlapping;

a first inlet for a gas to flow in is formed in an upper surface of the valve cover; a second inlet is formed below and in communication with the first inlet a third inlet circumferentially symmetric to the first inlet is formed in the valve cover; the third inlet is not in communication with the upper surface of the valve cover; a first annular groove is formed between the first inlet and the third inlet, so that the two inlets are in communication with each other;

a first outlet for a gas to flow out is formed in a lower surface of the valve body; a second outlet is formed above and in communication with the first outlet a third outlet circumferentially symmetric to the first outlet is formed in the valve body; the third outlet is not in communication with the lower surface of the valve body; a second annular groove is formed between the first outlet and the third outlet such that the two outlets are in communication with each other;

the second through holes and the first through holes are distributed in a circumferentially symmetric manner; the first inlet, the first outlet, one of the second through holes and one of the first through holes correspond to and are in communication with one another to form the gas outlet passage; and the second inlet, the second outlet, the other first through hole and the other second through hole correspond to one another and are in communication with the first annular groove and the second annular groove to form diverting passages for pressure relief and diversion.

2. The high-temperature quick-opening spherical sealing shut-off valve according to claim 1, wherein the first through hole and the second through hole are kidney-shaped arcuate-type holes; and the first through hole has an included angle of 11.1°, while the second through hole has an included angle of 66.6°.

3. The high-temperature quick-opening spherical sealing shut-off valve according to claim 1, wherein the valve rod comprises an upper valve rod and a lower valve rod that are fixedly mounted on respective upper and lower sides of a center of the valve clack; the upper valve rod and the valve clack are hollowed out and in communication with each other; a valve rod core assembly is coaxially inserted into the upper valve rod; an upper end of the valve rod core assembly is in sealing fit with an upper end of the upper valve rod; a water inlet pipe and a water outlet pipe are disposed at the upper end of the valve rod core assembly, and a channel for cooling water to flow in and out of the upper valve rod and the valve clack is disposed within the valve rod core assembly.

4. The high-temperature quick-opening spherical sealing shut-off valve according to claim 3, wherein the channel comprises a water inlet passage and a water outlet passage; the water inlet passage is located along an axis of the valve rod core assembly, and a horizontal tube extending into the valve clack is disposed at a tail end of the water inlet passage; a gap is formed between a circumferential surface of the valve rod core assembly and an inner wall of the valve rod; and a water outlet in communication with the water outlet passage is formed in a circumferential surface of the valve rod core assembly.

5. The high-temperature quick-opening spherical sealing shut-off valve according to claim 3, wherein steel plates are hermetically mounted at outer circumferential positions of the valve body and the valve cover; a gap is formed between each of the steel plates and each of the valve body and the valve cover; and the steel plates have a plurality of pipe joints allowing cooling water to flow in and out.

6. The high-temperature quick-opening spherical sealing shut-off valve according to claim 4, wherein the valve clack comprises a clack body and a cover plate; mounting grooves for mounting of the cover plate are formed in upper and lower side faces of the clack body, respectively; a central hole for holding the horizontal tube is formed in the clack body; a spherical seal is formed between the cover plate and each of the mounting grooves; a surface of the valve clack that is in contact with the valve seat is spray-coated with a metal film;

a sealing ring is formed between the valve clack and each of the valve cover and the valve seat; the sealing ring comprises an inner side and an outer side that are located at the second through holes; and oil filling holes in communication with the sealing rings are formed in the valve cover and the valve seat.

7. The high-temperature quick-opening spherical sealing shut-off valve according to claim 6, wherein an upper support is mounted on the valve cover, while a lower support is mounted on the valve body; the upper valve rod is rotatably mounted on the upper support, while the lower valve rod is rotatably mounted on the lower support; the friction adjusting mechanism is mounted between the lower support and the lower valve rod; the friction adjusting mechanism comprises a plurality of adjusting seats and check nuts; the adjusting seats are sleeved on and in running fit with the lower valve rod; the outer circumference of each adjusting seat is in screw thread fit with the lower support; and anti-rotation blocks corresponding to the adjusting seats are mounted on the lower support.

8. The high-temperature quick-opening spherical sealing shut-off valve according to claim 1, wherein a connecting cap is disposed on the upper valve rod, and the connecting cap covers the valve rod core assembly;

thrust ball bearings are disposed between each adjusting seat and the lower valve rod and between the connecting cap and the valve rod core assembly, respectively; and a deep groove ball bearing is disposed between the upper valve rod and the upper support.

9. The high-temperature quick-opening spherical sealing shut-off valve according to claim 1, wherein rotary shaft lip seals are disposed between the lower valve rod and the valve body, between the valve rod core assembly and the upper valve rod and between the upper valve rod and the valve cover, respectively, and filled with a lubricating sealing grease.

* * * * *